United States Patent [19]

Evans et al.

[11] Patent Number: 5,132,340
[45] Date of Patent: Jul. 21, 1992

[54] INCORPORATING SILICA FILLER INTO POLYSILOXANE RUBBER

[75] Inventors: Edwin R. Evans, Clifton Park; Lawrence G. Waters, Watervliet; Michael J. Rosko, Schaghticoke, all of N.Y.

[73] Assignee: General Electric Company, Waterford, N.Y.

[21] Appl. No.: 785,894

[22] Filed: Oct. 30, 1991

Related U.S. Application Data

[63] Continuation of Ser. No. 523,303, May 14, 1990, abandoned, which is a continuation of Ser. No. 220,441, Jul. 13, 1988, abandoned, which is a continuation of Ser. No. 869,162, May 30, 1986, abandoned.

[51] Int. Cl.$^5$ .............................................. C08K 9/00
[52] U.S. Cl. ..................................... 523/209; 524/588
[58] Field of Search ......................... 524/588; 523/209

[56] References Cited

U.S. PATENT DOCUMENTS

| 4,360,610 | 11/1982 | Murray et al. | 523/209 |
| 4,418,165 | 11/1983 | Polmanteer et al. | 523/209 |
| 4,448,927 | 5/1984 | Folender et al. | 524/866 |
| 4,529,774 | 7/1985 | Evans et al. | 523/209 |

Primary Examiner—Melvyn I. Marquis
Assistant Examiner—Karen A. Hellender

[57] ABSTRACT

A process is disclosed whereby silica filler may be surface treated in situ following addition to a curable polysiloxane gum.

19 Claims, No Drawings

INCORPORATING SILICA FILLER INTO POLYSILOXANE RUBBER

This application is a continuation of application Ser. No. 07/523,303, filed May 14, 1990, now abandoned, which is a continuation of application Ser. No. 07/220,441, filed Jul. 13, 1988, now abandoned, which is a continuation, of application Ser. No. 869,162, filed May 30, 1986, now abandoned.

This invention relates to a method for incorporating silica filler into polysiloxane rubber. More particularly, this invention relates to a method for incorporating silica filler into such rubber and surface treating in situ.

BACKGROUND OF THE INVENTION

Curable silicone gums are normally compounded with reinforcing fillers, such as finely divided silica, to impart maximum physical properties when cured into rubber. To preclude or control crepe hardening during shelf aging, i.e. preventing polymer-filler interactions, the filler is surface treated with an agent octamethylcyclotetrasiloxane or a fluorosilicone hydrolyzate to reduce the number of free silanol groups on the surface of the finely divided silica.

One method for surface treating the silica filler, U.S. Pat. No. 4,529,774, exposes the same to a fluorosilicone hydrolyzate in the vapor phase. The hydrolyzate is a mixture of silanol terminated linear siloxane oligomers with mixed cyclic siloxane compounds. The ratio of linears to cyclics varies with the linears being 14-36% by weight while the cyclics may vary over the range of 64-86% by weight. The hydroxy end-group content for such a hydrolyzate may vary over the range of 1.0-2.5% by weight.

The vapor phase filler treatment involves an initial heating of the silica in a fluidized reactor at temperatures in excess of 110° C. to effect removal of adsorbed moisture. The hydrolyzate is then pumped in, under pressure, while the temperature is raised to 280°-300° C. to effect the desired grafting to surface silanols. This procedure usually provides good reinforcing filler, however, depending upon the acidity level and the presence of contaminants such as iron, polymeric gum balls can be formed in the filler. The conditions of treatment can also lead to particulate contamination due to vessel corrosion. As a consequence of the above, reproducibility of the treatment is poor. Further, the treatment of filler by this manner and incorporation of the same into polysiloxane rubbers is a cumbersome process which requires both treatment and blending facilities.

Accordingly, it is an object of the present invention to simplify the treatment of silica filler and the incorporation of the same in to polysiloxane rubbers.

It is a further object of the present invention to produce silica filled polysiloxane rubber having the desired levels of physical properties at reduced levels of silica filler content.

It is a further object of the present invention to combine the surface treatment process for silica filler and the incorporation of silica filler into polysiloxane rubber into a single step.

It is still a further object of the present invention to produce a heat age stable halogenated alkyl or aryl substituted polysiloxane rubber wherein silica filler is surface treated in situ.

DETAILED DESCRIPTION OF THE INVENTION

Briefly, according to the present invention there is provided a method for incorporating silica filler into polysiloxane gum. This method includes the steps of:
(a) mixing curable, non-condensable, polysiloxane gum, silica filler, and condensable diorganopolysiloxane; and
(b) heating said mixture to a temperature of at most about 210° C. for a sufficient time to complete the condensation reaction between said silica filler and said condensable diorganopolysiloxane.

The curable polysiloxane gum may be immediately shaped and cured or it may be stored and cured at some later time.

Curable polysiloxane gum for use herein must be non-condensable and non-reactive upon simple heating below about 210° C., i.e. in the absence of a catalyst or other curing agent, it must not react in substantial amounts so as to interfere with the surface treatment under heat or prevent a subsequent cure. Curable polysiloxane gums which are preferred herein are diorganopolysiloxane gums with silanol, vinyl, alkoxy, or methyl functional groups.

Broadly, suitable diorganopolysiloxane gums have the general formula:

$$R_aSiO_{4-a/2} \tag{1}$$

where R is selected from alkyl radicals of 1 to 8 carbon atoms, vinyl radicals, phenyl radicals, haloalkyl radicals of 3 to 10 carbon atoms, halophenyl radicals, hydroxy radicals, alkoxy radicals, aryloxy radicals, cyano-alkyl and mixtures thereof and a varies from about 1.98 to about 2.01. It should be mentioned that the invention does not reside in the exact type of gum employed nor the process and functional groups by which it is cured. As stated above, it is only necessary that the gum be non-condensable and non-reactive as defined above.

Preferably, the diorganopolysiloxane gum has the formula:

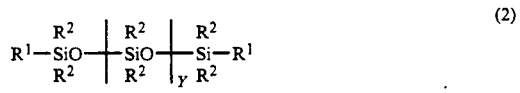

and has a viscosity that varies from about 500,000 to about 300,000,000 and more preferably from about 1,000,000 to about 200,000,000 centipoise at 25° C. In formula 2, $R^1$ may be vinyl, methyl, hydroxy, or alkoxy; $R^2$ may be vinyl, phenyl, alkyl of 1 to 8 carbon atoms, fluoroalkyl of 3 to 10 carbon atoms, or mixtures thereof; and Y varies from 2,500 to 11,000.

Persons skilled in the art are familiar with gums fitting the description of formulas 1 or 2 above and with the methods of cure or vulcanization thereof. Generally a catalyst is necessary to obtain reasonable reaction rates and cure times. Common catalysts employed in free radical cure, i.e. that cure involving crosslinking between free radical methyl or vinyl groups, are organic peroxide catalysts, such as dialkyl peroxides, diaralkyl peroxides, alkyl aralkyl peroxides, and the like; metallic catalysts, such as platinum; organometallic catalysts such as organoplatinum complexes; and organosilicon catalysts.

Crosslinking agents may be employed in the cure of the rubber, such as low molecular weight M-stopped polysiloxanes and vinyl polysiloxanes, however, hydride crosslinking agents are not recommended due to their reactivity at temperatures and conditions of surface treatment. Thus, it is desirable that hydride crosslinking agents be added just subsequent to the heating and treatment of the silica or formulated into a two component system.

The diorganopolysiloxane gums are manufactured and cured into rubber by methods well known in the art. Reference is made to Chemistry and Technology of Silicones, Noll, Walter, Academic Press, N.Y., NY, 1968 which is incorporated herein by reference.

Silica fillers suitable for use herein are finely divided reinforcing fillers which may have free hydroxyl groups in the form of either Si-bonded functional groups or adsorbed moisture, depending on their method of preparation. The Si-bonded hydroxyl groups may also have been converted to other functional groups, such as alkoxy, in their manufacture.

These silica fillers are reinforcing fillers in contrast to other fillers of non-reinforcing, non-structure-forming type, such as titanium dioxide or calcium carbonate. Examples of such silica fillers may be found described in U.S. Pat. Nos. 2,541,137; 2,610,167 and 2,657,149, as well as French Pat. Nos. 1,025,837 (issued 1953) and 1,090,566 (issued 1955). Such structure-causing fillers may be slightly acidic or alkaline (i.e., have pH's slightly below or above 7) depending upon the method of manufacture, and may be obtained through the aerosol-aerogel process, by fuming processes such as by the vapor phase burning of silicon tetrachloride or ethyl silicate, by precipitation means, etc. Commercially available fumed silicas include CAB-O-SIL ® (Cabot Corp.) and AEROSIL ® (Degussa, Inc.) Fumed silica s preferred.

Condensable diorganopolysiloxanes for use herein must at some temperature less than 210° be liquids and have hydroxy or alkoxy functionality which will readily react with the silica surface. Insufficiently condensable diorgnopolysiloxanes can be made readily reactive with the silica surface by the addition of condensation promoters such as tin soaps, stannous salts, and Lewis acids. These condensation promoters can be added so long as they do not promote unwanted side reactions such as polymerization evidenced by formation of gum balls. Although hydroxy or alkoxy functionality may occur any where on the polymer, the diorganopolysiloxanes are preferably hydroxy terminated with no condensable substitution on chain to prevent the formation of crosslinked gum balls. Preferred condensable diorganopolysiloxanes have the general formula:

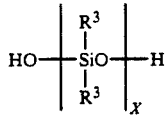

wherein X has a value of from about 1 to 20 and $R^3$ is a monovalent substituted or unsubstituted hydrocarbon radical. Preferably, the condensable diorganopolysiloxanes are all hydroxy terminated diorganopolysiloxanes of the above formula. The balance of the condensable diorganopolysiloxanes may be, for example, side chain hydroxy substituted siloxanes and the like. It is preferred that X in the above formula be between about 2 and 10 and most preferably about 2 or 3 and the $R^3$ of the above formula is generally at least about 50% by number methyl with the balance selected from alkyl, such as methyl, ethyl, propyl, butyl, hexyl, and the like; alkenyl, such as vinyl and the like; aryl, such as phenyl and the like; cycloalkyl, such as cyclopentyl, cyclohexyl, cycloheptyl, and the like; halogenated alkyl, such as 3-chloropropyl, 4-chlorobutyl, 3,3-difluoroallyl, 3,3,3-trifluoropropyl and the like; halogenated aryl, such as 3-fluorophenyl and the like; halogenated cycloalkyl; and the like. Where $R^3$ is halogenated, the preferred $R^3$ is —$CH_2CH_2R^4$ wherein $R^4$ is perfluoroalkyl such as perfluoromethyl, perfluoroethyl, perfluorohexyl, and the like. $R^3$ should have no more than about 10 carbon atoms.

The above hydroxy terminated diorganopolysiloxanes may be produced by methods well known to the art. In one method, diorganodihalogensilanes are partially hydrolyzed to form a mixture of cyclic and linear diorganopolysiloxanes. Further details of this method may be found in U.S. Pat. Nos. 2,737,506 (Hurd, et al.), 3,937,684 (Razzano) 4,341,888 (Razzano) and 4,529,774 (Evans, et al.) all incorporated herein by reference.

In another method, cyclic diorganopolysiloxanes are heated in an organic solvent in the presence of a $H^+$ treated clay catalyst to open the ring and produce a hydroxyl terminated diorganopolysiloxane. In this method, composition of the diorganopolysiloxane product can be controlled by controlling the purity and ring size of the cyclic diorganopolysiloxane feedstock. This second method is preferred due to the purity and variety of the cyclic polydiorganosiloxanes available.

Other additives may be present in the uncured mixture, including, pigments, stabilizers, plasticizers, additional fillers and the like. Persons skilled in the art will realize what additives are necessary and suitable to accomplish a given purpose.

According to the process of the present invention the curable, non-condensable polysiloxane gum, silica filler, and condensable diorganopolysiloxane are mixed in a vessel under mild heating if necessary to reduce viscosity. Where the gum is very viscous, the silica must be added in stepwise or incremental portions in order to allow the batch to mass with mixing.

The amount of silica filler added to the batch varies within very wide limitations. It may be desirable to master batch the curable polysiloxane gum for later cutting with unfilled gum. Thus, from about 10 to about 400 parts by weight silica filler may be added for each 100 parts by weight curable polysiloxane gum. Normally, from about 10 to about 100 parts by weight of silica filler is employed. The amount of condensable diorganopolysiloxane added to the batch of course depends on the amount of silica added. This amount should range from about 5 to about 50 parts by weight, more preferably from about 17 to about 30 parts by weight and most preferably from about 19 to about 25 parts by weight condensable diorganopolysiloxane for each 100 parts by weight silica.

When the batch is fully massed, treatment of the filler may be accomplished by simply raising the temperature of the batch under mixing to at most about 210° C. Temperatures in excess of 210° C. will begin to degrade and prematurely cure the polysiloxane gum. Of course, to this point no cure catalyst for the gum has been added, and generally gums below about 210° C. will not cure without a catalyst. The temperature of treatment may range down to about 110° C. while maintaining acceptable treatment times. Reasonable treatment or reaction times vary from about 1 to about 4 hours with about 2 hours being common practice. Preferred reaction temperatures vary from about 130° C. to about 180° C. with optimum reaction temperatures ranging from about 140° C. to about 160° C.

During heating and treatment, volatiles may be removed by purge or vacuum. Water is produced by condensation and also non-condensable or non-curable volatiles may have been added to the batch which it is desirable to remove. For example, where the condensable diorganopolysiloxanes are added as a hydrolyzate, the cyclopolysiloxanes may be removed at this point by vacuum or nitrogen purge.

Following the treatment or heating step, catalysts stabilizers and even additional gums or crosslinking agents may be added to provide cure and long term storage capability in the curable polysiloxane gum. As explained above, the gum may be a heat curable gum, a room temperature curable gum, or even a low temperature cured gum. Judicious selection of materials and simple experimentation is contemplated to achieve optimal performance for a given situation.

In order that persons skilled in the art may better understand how to practice the present invention, the following examples are offered by way of illustration and not by way of limitation.

EXAMPLES

Examples 1 and 2

To a clean 1420 ml dough mixer was charged 20 grams of a condensable diorganopolysiloxane treating agent being a silanol terminated methyl-3,3,3-trifluoropropylpolysiloxane fluid having a hydroxy end-group content of 6.8% by weight and 401.5 grams of a non-condensable polysiloxane gum and additives consisting of 380 grams vinyl terminated methyl-3,3,3-trifluoropropylsiloxane gum with a Williams Plasticity (3' value at 25° C.) of 200±20 and vinyl end-group content of 0.01-0.20% by weight, 20 grams vinyl terminated methyl-3,3,3-trifluoropropylsiloxane gum having a vinyl on chain content of 1.6% by weight (as $CH_2=CH-$) and a Williams Plasticity (3' value at 25° C.) of 190±20, 0.5 grams M-stopped polydimethyl siloxane gum with 4.2% by vinyl on chain and 1.0 gram of a vinyl terminated polydimethylsiloxane plasticizer. This mixture was mixed at a shear rate of 20-45 rpm for 30 minutes then heated to 50° C. while under a blanket of nitrogen. Finely divided untreated fumed silica having a surface area of 200±20 m²/gram was added incrementally with time given between each addition for the batch to mass. The total weight amounts of fumed silica added is shown in Table I. When the filler addition was completed and the batch was fully massed, the temperature was increased to 120°-160° C. and held for 1 to 3 hours under a nitrogen purge rate of 1-6 ft³/hr. The nitrogen purge rate was then increased to 10-15 ft³/hr for 2-6 hours. The batch temperature was finally reduced to less than 80° C. prior to the addition of 0.7 grams of a stabilizer, cerium hydroxide having a purity of 90.5% and a sieve size of +250 mesh. The gums are cured by adding Lupersol 101 curing agent, 2,5-dimethyl-2,5-di(t-butylperoxy) hexane, in the proportion of 0.75 grams/100 grams of silica plus diluent gum and subsequently press curing for 15 min. at 177° C. followed by a post bake at 204° C. for 4 hours.

Control

To a clean 1420 ml dough mixer was charged 412.5 grams of non-condensable polysiloxane gum and additives consisting of 380 grams vinyl terminated methyl-3,3,3-trifluoropropylsiloxane gum with a Williams Plasticity (3' value at 25° C.) of 200±20 and a vinyl end-group content of 0.01-0.20% by weight, 20 grams vinyl terminated methyl-3,3,3-trifluoropropylsiloxane gum having a vinyl on chain content of 1.6% by weight (as $CH_2=CH-$) and a Williams Plasticity (3' value at 25° C.) of 190±20, 0.5 grams M-stopped polydimethylsiloxane gum with 4.2% by weight vinyl on chain and 12 grams process aid, a silanol terminated polydimethylsiloxane telomer where the average chain contains 5 siloxane units. This mixture was mixed at a shear rate of 20-45 rpm for 30 minutes then heated to 50° C. While under a blanket of nitrogen 120 grams finely divided, treated, fumed silica which had a surface area prior to treatment of 200±20 m²/gram was added incrementally with time given between each addition for the batch to mass. Treatment of the fumed silica had been carried out according to U.S. Pat. No. 4,529,774. Specifically, the fumed silica had been dried, and contacted at 280°-300° C. for 8 hours with fluorosilicone hydrolyzate being a mixture of fluorosilicone telomeric silanol and fluorosilicone cyclics, in the vapor phase. Subsequently, the residual fluorosilicone hydrolyzate had been blown off and the treated fumed silica devolatilized for 10 hours at 300° under nitrogen purge. When the filler addition was completed and the batch was fully massed, the temperature was increased to 120°-160° C. and held for 1 to 3 hours under a nitrogen purge rate of 1-6 ft³/hr. The batch temperature was finally reduced to 80° C. prior to the addition of 0.7 grams of a stabilizer, cerium hydroxide having a purity of 90.5% and a sieve size of +250 mesh. The gum and fumed silica mixture was cured identically to Example 1 and 2.

TABLE I

|  | 1 | 2 | C |
| --- | --- | --- | --- |
| Treating agent, grams | 20 | 20 | — |
| Non-condensable gum & additives, grams | 401.5 | 401.5 | 412.5 |
| Fumed silica, grams | 100 | 80 | 120 |
| Shore A | 42 | 38 | 40 |
| Tensile, psi | 1665 | 1615 | 1500 |
| Elongation % | 465 | 510 | 450 |
| Die B Tear, pi | 165 | 150 | 170 |
| Spec. grav. | 1.42 | 1.426 | 1.42 |
| Comp. Set., Method B, 22 hours/177° C., % | 14.0 | — | 18.0 |
| Processability | Very Good | Very Good | Very Good |

As seen in Table 1, fumed silica incorporated into gum according to the present invention produces a polydiorganosiloxane rubber having at least as good a property profile as pretreated fumed silica of the prior art.

Examples 3 and 4

To a clean 1420 ml dough mixer was charged hydrolyzate fluid, prepared according to U.S. Pat. No. 4,529,774 from dichloromethyl-3,3,3-trifluoropropyl silane, containing non-condensable cyclopolysiloxanes in addition to condensable telomeric silanol as shown in Table 2 and 401.5 grams of a non-condensable polydiorganosiloxane gum and additives consisting of 380 grams vinyl terminated methyl-3,3,3-trifluoropropylsiloxane gum with a Williams Plasticity of (3' value at 25° C.) of 200±20 and vinyl end-group content of 0.01–0.20% by weight, 20 grams vinyl terminated methyl-3,3,3-trifluoropropylsiloxane gum having a vinyl on chain content of 1.6% by weight (as $CH_2=CH-$) and a Williams Plasticity (3'value at 25° C.) of 190±20, 0.5 grams M-stopped polydimethylsioxane gum with 4.2% by weight vinyl on chain and 1.0 gram of a vinyl terminated polydimethylsiloxane plasticizer. This mixture was mixed at a shear rate of 20–45 rpm for 30 minutes then heated to 50° C. While under a blanket of nitrogen 112 grams of finely divided untreated fumed silica having a surface area of 200±20 m²/gram was added incrementally with time given between each addition for the batch to mass. When the filler addition was completed and the batch was fully massed the temperature was increased to 120°–160° C. and held for 1 to 3 hours under a nitrogen purge rate of 1-6 ft³/hr. The nitrogen purge rate was then increased to 10-15 ft³/hr for 2-6 hours. The batch temperature was finally reduced to less than 80° C. prior to the addition of 0.7 grams of a stabilizer, cerimum hydroxide having a purity of 90.5% and a sieve size of +250 mesh. The non-condensable cyclopolysiloxanes were substantially removed during nitrogen purge. The gums are cured by adding LUPERSOL 101 curing agent, 2,5-dimethyl-2,5-di(t-butylperoxy) hexane, in the proportion of 0.75 grams/100 grams of silica plus diluent gum and subsequently press curing for 15 min. at 177° C. followed by post bake at 204° C. for 4 hours.

TABLE 2

|  | 3 | 4 |
|---|---|---|
| Hydrolyzate fluid, grams | 28 | 44.8 |
| Non-condensable gum & additives, grams | 401.5 | 401.5 |
| Fumed silica, grams | 112 | 112 |
| Hydrolyzate fluid, silanol/cyclic, wght ratio | 70/30 | 45/55 |
| Shore A | 43 | 42 |
| Tensile, psi | 1545 | 1545 |
| Elongation % | 480 | 515 |
| Die B Tear, pi | 170 | 165 |
| Spec. grav. | 1.424 | 1.416 |
| Processability | Very Good | Very Good |

Table 2 shows that the hydrolyzate treating agent of the prior art may be used with the incorporation method of the present invention to produce treated silica with at least equivalent properties.

Examples 5–7

To a clean 1420 ml dough mixer was charged hydrolyzate fluid, prepared according to U.S. Pat. No. 4,529,774 from dichloromethyl-3,3,3-trifluoropropyl silane, containing non-condensable cyclopolysiloxanes in addition to condensable telomeric silanol as shown in Table 3 and 416 grams of a non-condensable polydiorganosiloxane gum and additives consisting of silanol terminated methyl-3,3,3-trifluoropropylsiloxane gum having a Williams Plasticity (3' value at 25° C.) of 200±30 and a vinyl on chain content of 0.06–0.07% by weight and 16 grams of a trimethyl siloxy stopped polydimethylsiloxane gum having a Williams Plasticity of 90±20 and a vinyl on chain content of 4.2% by weight (as $CH_2=CH-$). The mixture is agitated at a shear of 20–50 rpms while heating to 50° C. under a nitrogen blanket. After 30 minutes of mixing, 92 grams of finely divided silica was added incrementally with time given between each addition for the batch to mass. When filler addition was completed and the batch was fully massed, the temperature was increased to 140°–160° C. for 1–3 hours with a nitrogen purge rate of 1–6 ft³/hr. The nitrogen purge rate was then increased to 10–15 ft³/hr for 2–6 hours. The batch temperature was finally reduced to less than 80° C. and 1.0 gram titanium dioxide was added along with 0.2 grams of iron octoate stabilizer, iron-2-ethylhexanoate 6% by weight in mineral spirits. The non-condensable cyclopolysiloxanes were substantially removed during nitrogen purge. The gums are cured by adding CADOX TS-50 curing agent, 2,4-dichlorobenzoylperoxide in the proportion of 1.6 grams/100 grams of silica plus diluent gum and subsequently press curing for 15 minutes at 124° C. and post baking for 4 hours at 204° C.

TABLE 3

|  | 5 | 6 | 7 |
|---|---|---|---|
| Hydrolyzate fluid, grams | 40 | 52 | 66 |
| Non-condensable gum & additives, grams | 416 | 416 | 416 |
| Fumed silica, grams | 92 | 92 | 92 |
| Hydrolyzate fluid, hydroxy end-group content, wght % | 1.7 | 1.7 | 1.7 |
| Shore A | 38 | 40 | 40 |
| Tensile, psi | 1285 | 1475 | 1290 |
| Elongation % | 450 | 448 | 460 |
| Die B Tear, pi | 96 | 98 | 100 |
| Spec. grav. | 1.394 | 1.395 | 1.393 |
| Comp. Set., Method B, 22 hours/149° C., % | 20.6 | 16.5 | 18.0 |
| Processability | Good | Very Good | Partitions on mill and sticks |

What is claimed is:

1. A process for incorporating silica filler into gum consisting essentially of the steps of:
   (a) mixing components consisting essentially of: curable polysiloxane gum, said gum being substantially non-condensable with heating below about 210° C.; from about 10 to about 400 parts by weight silica filler having Si-bonded hydroxy or alkoxy functional groups for each 100 parts by weight gum and from about 5 to about 50 parts by weight condensable diorganopolysiloxane for each 100 parts by weight filler, said condensable diorganopolysiloxane consisting of the hydrolyzate of diorganodihalogensilanes of the formulas $R^1RSiX_2$, and $R^2_2SiX_2$, wherein $R^1$ is 3,3,3-trifluoropropyl, R is methyl or ethyl, $R^2$ is methyl or ethyl, and X is a halogen, said hydrolyzate comprising a mixture of fluoroalkyl-functional cyclic diorganopolysiloxanes having 3 to 10 siloxy units and silanol end-stopped low molecular weight linear diorganopolysiloxanes having hydroxy functionality that is readily reactive with the surface of said silica filler at temperatures less than about 210° C.; and
   (b) heating said mixture to a temperature of at most about 210° C. for a sufficient time to complete the condensation reaction between said silica filler and said condensable diorganopolysiloxane.

2. The process of claim 1 wherein said heating step is followed by the step of curing said polysiloxane gum.

3. The process of claim 1 wherein said heating step is followed by the step of adding a polysiloxane gum cure catalyst.

4. The process of claim 1 wherein said mixing and heating steps are performed simultaneously.

5. The process of claim 1 wherein said temperature of heating ranges from about 110° C. to about 210° C.

6. The process of claim 5 wherein said temperature of heating ranges from about 130° C. to about 180° C.

7. The process of claim 6 wherein said temperature of heating ranges from about 140° C. to about 160° C.

8. The process of claim 1 wherein said polysiloxane gum has a viscosity of from about 500,000 to about 300,000,000 centipoise at 23° C.

9. The process of claim 1 wherein said polysiloxane gum has the general formula $$R_a SiO_{4-a/2}$$

where R is selected from alkyl radicals of 1 to 8 carbon atoms, vinyl radicals, phenyl radicals, haloalkyl radicals of 3 to 10 carbon atoms, halophenyl radicals, hydroxy radicals, alkoxy radicals, aryloxy radicals, cyanoalkyl radicals, and mixtures thereof and a varies from about 1.98 to about 2.01.

10. The process of claim 1 wherein said polysiloxane gum has the general formula

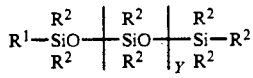

where $R^1$ may be vinyl, methyl, hydroxy, or alkoxy; $R^2$ may be vinyl, phenyl, alkyl of 1 to 8 carbon atoms, fluoroalkyl of 3 to 10 carbon atoms, or mixtures thereof; and Y varies from 2,500 to 11,000.

11. The process of claim 10 wherein said polysiloxane gum is M-stopped.

12. The process of claim 10 wherein said polysiloxane gum contains vinyl functional groups.

13. The process of claim 10 wherein said polysiloxane gum contains hydroxy functional groups.

14. The process of claim 10 wherein said polysiloxane gum contains alkoxy functional groups.

15. The process of claim 1 wherein said heating step is followed by the step of adding a crosslinking agent.

16. A mixture consisting essentially of:
    (a) curable polysiloxane gum, said gum being substantially non-condensable with heating below about 210° C.;
    (b) from about 10 to about 400 parts by weight silica filler having Si-bonded hydroxy or alkoxy functional groups for each 100 parts by weight gum; and
    (c) from about 5 to about 50 parts by weight condensable diorganopolysiloxane for each 100 parts by weight filler, said condensable diorganopolysiloxane consisting of the hydrolyzate of diorganodihalogensilanes of the formulas $R^1RSiX_2$, and $R^2_2 SiX_2$, wherein $R^1$ is 3,3,3-trifluoropropyl, R is methyl or ethyl, $R^2$ is methyl or ethyl, and X is a halogen, said hydrolyzate comprising a mixture of fluoroalkyl-functional cyclic diorganopolysiloxanes having 3 to 10 siloxy units and silanol end-stopped low molecular weight linear diorganopolysiloxanes having hydroxy functionality is readily reactive with the surface of said silica filler at temperatures less than about 210° C.

17. The mixture of claim 16 wherein said polysiloxane gum has the general formula $$R_a SiO_{4-a/2}$$

where R is selected from alkyl radicals of 1 to 8 carbon atoms, vinyl radicals, phenyl radicals, haloalkyl radicals of 3 to 10 carbon atoms, halophenyl radicals, hydroxy radicals, alkoxy radicals, aryloxy radicals, cyanoalkyl radicals, and mixtures thereof and a varies from about 1.98 to 2.01.

18. A process for incorporating silica filler into gum consisting essentially of:
    (a) mixing components consisting essentially of: curable polysiloxane gum, said gum being substantially non-condensable with heating below about 210° C.; from about 10 to about 400 parts by weight silica filler having Si-bonded hydroxy or alkoxy functional groups for each 100 parts by weight gum; an effective amount of crosslinking agent; and from about 5 to about 50 parts by weight condensable diorganopolysiloxane for each 100 parts by weight filler, said condensable diorganopolysiloxane consisting of the hydrolyzate of diorganodihalogensilanes of the formulas $R^1RSiX_2$, and $R^2_2 SiX_2$, wherein $R^1$ is 3,3,3-trifluoropropyl, R is methyl or ethyl, $R^2$ is methyl or ethyl, and X is a halogen, said hydrolyzate comprising a mixture of fluoroalkyl-functional cyclic diorganopolysiloxanes having 3 to 10 siloxy units and silanol end-stopped low molecular weight linear diorganopolysiloxanes having hydroxy functionality that is readily reactive with the surface of said silica filler at temperatures less than about 210° C.; and
    (b) heating said mixture to a temperature of at most about 210° C. for a sufficient time to complete the condensation reaction between said silica filler and said condensable diorganopolysiloxane.

19. A mixture consisting essentially of:
    (a) curable polysiloxane gum, said gum being substantially non-condensable with heating below about 210°0 C.;
    (b) from about 10 to about 400 parts by weight silica filler having Si-bonded hydroxy or alkoxy functional groups for each 100 parts by weight gum; and
    (c) from about 5 to about 50 parts by weight condensable diorganopolysiloxane for each 100 parts by weight filler, said condensable diorganopolysiloxane consisting of the hydrolyzate of diorganodihalogensilanes of the formulas $R^1RSiX_2$, and $R^2_2 SiX_2$, wherein $R^1$ is 3,3,3-trifluoropropyl, R is methyl or ethyl, $R^2$ is methyl or ethyl, and X is a halogen, said hydrolyzate comprising a mixture of fluoroalkyl-functional cyclic diorganopolysiloxanes having 3 to 10 siloxy units and silanol end-stopped low molecular weight linear diorganopolysiloxanes having hydroxy functionality that is readily reactive with the surface of said silica filler at temperatures less than about 210° C., and
    (d) an effective amount of crosslinking agent.

* * * * *